United States Patent
Ottesen et al.

(10) Patent No.: US 6,831,808 B2
(45) Date of Patent: Dec. 14, 2004

(54) METHOD AND APPARATUS FOR DETERMINING TRACK IDENTITY FROM ABBREVIATED TRACK IDENTIFYING DATA IN A DISK DRIVE DATA STORAGE DEVICE

(75) Inventors: Hal Hjalmar Ottesen, Rochester, MN (US); Gordon James Smith, Rochester, MN (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 157 days.

(21) Appl. No.: 09/930,596

(22) Filed: Aug. 15, 2001

(65) Prior Publication Data

US 2003/0035239 A1 Feb. 20, 2003

(51) Int. Cl.[7] .............................. G11B 5/596; G11B 5/09
(52) U.S. Cl. ...................................... 360/78.06; 360/48
(58) Field of Search .............................. 360/48, 78.04, 360/78.06, 49, 77, 78

(56) References Cited

U.S. PATENT DOCUMENTS

| | | | | |
|---|---|---|---|---|
| 4,544,968 A | | 10/1985 | Anderson et al. ............. 360/78 |
| 4,679,103 A | | 7/1987 | Workman ...................... 360/77 |
| 4,949,200 A | * | 8/1990 | Weng .......................... 360/72.2 |
| 5,526,202 A | * | 6/1996 | Blagaila et al. .......... 360/77.08 |
| 6,005,727 A | * | 12/1999 | Behrens et al. ............... 360/48 |
| 6,075,667 A | | 6/2000 | Kisaka et al. ................. 360/49 |
| 6,304,398 B1 | * | 10/2001 | Gaub et al. .................... 360/49 |
| 2002/0067563 A1 | * | 6/2002 | Belser ......................... 360/53 |

* cited by examiner

*Primary Examiner*—David Hudspeth
*Assistant Examiner*—Jason Olson
(74) *Attorney, Agent, or Firm*—Roy W. Truelson

(57) ABSTRACT

A disk for a disk drive data storage device contains embedded track identifying fields which identify a track within a range of tracks, the range being less than the full range of tracks on the disk surface. The full identity of a track during a track seek operation is determined by iteratively assuming a track identity and estimating acceleration of the transducer based on the assumed track identity, until a track identity is found for which estimated acceleration meets some predetermined threshold. Preferably, embedded servo fields are recorded at angularly spaced intervals on the disk surface, and every Nth servo field contains a Gray code full track identifier, while all servo fields in between contain abbreviated Gray code fields which identify a track within a range of tracks.

20 Claims, 11 Drawing Sheets

| M = 15 | | | | | Modulo 15 or 16 Track | M = 16 | | | | |
|---|---|---|---|---|---|---|---|---|---|---|
| p | b0 | b1 | b2 | b3 | | p | b0 | b1 | b2 | b3 |
| 0 | 1 | 0 | 0 | 0 | 0 | 1 | 0 | 0 | 0 | 0 |
| 1 | 1 | 1 | 0 | 0 | 1 | 0 | 1 | 0 | 0 | 0 |
| 0 | 0 | 1 | 0 | 0 | 2 | 1 | 1 | 1 | 0 | 0 |
| 1 | 0 | 1 | 1 | 0 | 3 | 0 | 0 | 1 | 0 | 0 |
| 0 | 1 | 1 | 1 | 0 | 4 | 1 | 0 | 1 | 1 | 0 |
| 1 | 1 | 0 | 1 | 0 | 5 | 0 | 1 | 1 | 1 | 0 |
| 0 | 0 | 0 | 1 | 0 | 6 | 1 | 1 | 0 | 1 | 0 |
| 1 | 0 | 0 | 1 | 0 | 7 | 0 | 0 | 0 | 1 | 0 |
| 0 | 1 | 1 | 1 | 1 | 8 | 1 | 1 | 0 | 1 | 1 |
| 1 | 1 | 1 | 0 | 1 | 9 | 0 | 1 | 1 | 0 | 1 |
| 0 | 0 | 1 | 0 | 1 | 10 | 1 | 0 | 1 | 0 | 1 |
| 1 | 0 | 1 | 0 | 1 | 11 | 0 | 0 | 1 | 0 | 1 |
| 0 | 1 | 0 | 0 | 1 | 12 | 1 | 1 | 0 | 0 | 1 |
| 1 | 1 | 0 | 0 | 1 | 13 | 0 | 1 | 0 | 0 | 1 |
| 0 | 0 | 0 | 0 | 1 | 14 | 1 | 0 | 0 | 0 | 1 |
| - | - | - | - | - | 15 | 0 | 0 | 0 | 0 | 1 |

FIG. 5

| Local Index n | Servo Sector Q(n) | Mod-16 Gray XM(a) | Full Gray S(n) | Actual Track XS(n) | Track Estimate ES(n) | Actual Velocity XV(n) | Velocity Estimate EV(n) |
|---|---|---|---|---|---|---|---|
| 0 | 43 | 2 | - | 5234.0 | 5234 | 0 | 0 |
| 1 | 44 | 4 | - | 5235.5 | 5236 | 1.5 | 2 |
| 2 | 45 | 7 | - | 5238.5 | 5239 | 3.0 | 3 |
| 3 | 46 | 11 | - | 5243.0 | 5243 | 4.5 | 4 |
| 4 | 47 | 1 | - | 5249.0 | 5249 | 6.0 | 6 |
| 5 | 48 | 9 | 5257 | 5256.5 | 5257 | 7.5 | 8 |
| 6 | 49 | 2 | - | 5265.5 | 5266 | 9.0 | 9 |
| 7 | 50 | 12 | - | 5276.0 | 5276 | 10.5 | 10 |
| 8 | 51 | 8 | - | 5288.0 | 5288 | 12.0 | 12 |
| 9 | 52 | 6 | - | 5301.5 | 5302 | 13.5 | 14 |

FIG. 9A

| | | | | | | | |
|---|---|---|---|---|---|---|---|
| 10 | 53 | 5 | – | | | | |
| 11 | 54 | 5 | – | 5316.5 | 5317 | 15.0 | 15 |
| 12 | 55 | 7 | – | 5333.0 | 5333 | 16.5 | 16 |
| 13 | 56 | 11 | – | 5351.0 | 5351 | 18.0 | 18 |
| 14 | 57 | 0 | – | 5370.5 | 5371 | 19.5 | 20 |
| 15 | 58 | 6 | – | 5391.5 | 5392 | 21.0 | 21 |
| 16 | 59 | 14 | – | 5414.0 | 5414 | 22.5 | 22 |
| 17 | 60 | 8 | – | 5438.0 | 5438 | 24.0 | 24 |
| 18 | 61 | 3 | – | 5463.5 | 5464 | 25.5 | 26 |
| 19 | 62 | 15 | – | 5490.5 | 5491 | 27.0 | 27 |
| | | | | 5519.0 | 5519 | 28.5 | 28 |

FIG. 9B

METHOD AND APPARATUS FOR DETERMINING TRACK IDENTITY FROM ABBREVIATED TRACK IDENTIFYING DATA IN A DISK DRIVE DATA STORAGE DEVICE

CROSS REFERENCE TO RELATED APPLICATION

The present invention is related to application Ser. No. 09/930,594, by Hal H. Ottesen and Gordon J. Smith, entitled "Improved Servo Format for Disk Drive Data Storage Devices", filed the same date as the present application, which is herein incorporated by reference.

FIELD OF THE INVENTION

The present invention relates to rotating disk data storage devices, and in particular, to servo systems used for positioning moveable transducer heads with respect to tracks of data stored on the surface of data disks.

BACKGROUND OF THE INVENTION

The latter half of the twentieth century has been witness to a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

The extensive data storage needs of modern computer systems require large capacity mass data storage devices. While various data storage technologies are available, the rotating magnetic rigid disk drive has become by far the most ubiquitous. Such a disk drive data storage device is an extremely complex piece of machinery, containing precision mechanical parts, ultra-smooth disk surfaces, high-density magnetically encoded data, and sophisticated electronics for encoding/decoding data, and controlling drive operation. Each disk drive is therefore a miniature world unto itself, containing multiple systems and subsystem, each one of which is needed for proper drive operation. Despite this complexity, rotating magnetic disk drives have a proven record of capacity, performance and cost which make them the storage device of choice for a large variety of applications.

A disk drive typically contains data recorded in concentric tracks on the surface of one or more rotating flat disks. A moveable actuator positions a transducer adjacent a desired track in order to read from or write to the track. Specially recorded servo fields or servo sectors located at angularly spaced intervals on the disk surface are used to identify and locate tracks of data for positioning the actuator. The servo sector conventionally includes a write recovery field which signals the beginning of the servo pattern, a track field which identifies a track number, usually as a Gray code encoding, and a position error field which is used to generate a position error signal (PES) indicating position of the transducer with respect to track centerline. The transducer periodically reads the servo sectors as the disk rotates to determine its current radial position, and a servo feedback system uses this information to accurately position the actuator to minimize the PES or follow a seek profile.

In order to keep up with advances in other areas of digital data processing technology, disk drive storage devices must make continual improvements in performance, reliability and data capacity. The need for greater data capacity drives a corresponding quest for higher areal density, i.e., the amount of data that can be stored per unit area of disk surface. In recent years there have been enormous increases in areal density of disk drives, and there is every indication that future data storage demand will require still further increases in areal density.

Areal density is approximately related to the product of track density (i.e., the number of concentric tracks per linear unit, measured in a radial direction) and the linear bit density (i.e., the number of bits of data in a track per linear unit, measured in a circumferential direction). Historically, increases in track density have not kept up with increases in linear bit density. One of the main reasons for this is noise in the PES. Other things being equal, the strength of a PES is roughly proportional to transducer head width, which is closely correlated to track width. However, as track width decreases, the standard deviation of PES noise does not scale proportionately, so that the signal-to-noise ratio decreases for decreasing track width.

A need exists for increased track densities in disk data storage devices, and in particular, for improved servo techniques which will increase the signal-to-noise ratio of PES signals.

SUMMARY OF THE INVENTION

In accordance with the present invention, a recording disk for use in a disk drive data storage device contains embedded track identifying fields which identify a track within a range of tracks, the range being less than the full range of tracks on the disk surface. The fall identity of a track during a track seek operation is determined by iteratively assuming a track identity and estimating acceleration of the transducer based on the assumed track identity, until a track identity is found for which estimated acceleration meets some predetermined threshold.

In the preferred embodiment, embedded servo fields are recorded at angularly spaced intervals on the disk surface. Every Nth servo field contains a full track identifier, while all servo fields in between contain abbreviated track identifying fields which identify a track within a range of tracks, where N is at least 2. Preferably, the track identifying fields are Gray code encodings.

In the preferred embodiment, the range of tracks of the abbreviated Gray code M is equal to N, the interval of occurrence of a track field of the first type. Preferably, N=M=16, although other numbers could be used.

In the preferred embodiment, the additional disk area made available by Gray code reduction is used to increase the position error field of each servo sector, thereby improving the signal-to-noise ratio of the PES without any change in net data capacity. Alternatively, part or all of the additional disk area made available by Gray code reduction may be used to store additional data. In any case, Gray code reduction provides additional area which may be used is some beneficial manner to either increase the net amount of data stored in a given disk surface, or to reduce the number of errors due to improved PES signal strength, or some combination thereof.

The details of the present invention, both as to its structure and operation, can best be understood in reference to the accompanying drawings, in which like reference numerals refer to like parts, and in which:

BRIEF DESCRIPTION OF THE DRAWING

FIG. 5 is a table showing Gray code encodings for an abbreviated track identifier field, according to the preferred embodiment.

FIGS. 9A and 9B are a sample table of values used in a track-seek estimator for a portion of a simulated ascending track seek operation, according to the preferred embodiment.

DETAILED DESCRIPTION OF THE PREFERRED EMBODIMENT

Overview of Disk Drive Design

Figure 1:
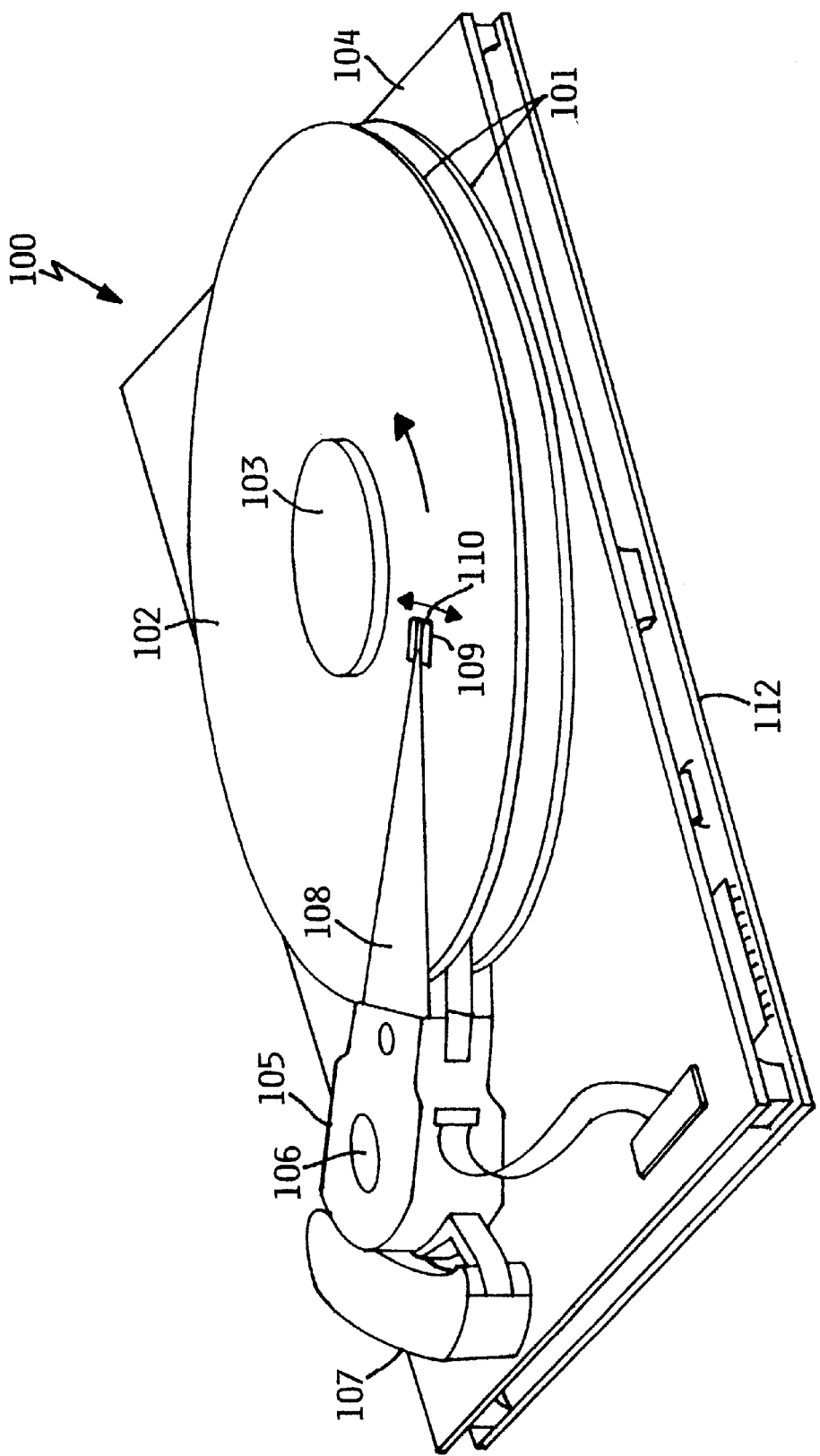
FIG. 1 is a simplified representation of a rotating magnetic disk drive storage device, for use in accordance with the preferred embodiment of the present invention.

A rotating rigid magnetic disk drive typically contains one or more smooth, flat disks which are permanently attached to a common spindle or hub. Where more than one disk is used, the disks are stacked on the spindle parallel to each other and spaced apart so that they do not touch. The disks and spindle are rotated in unison at a constant speed by a spindle motor.

The spindle motor is typically a brushless DC motor having a multi-phase electromagnetic stator and a permanent magnet rotor. The different phases of the stator are sequentially driven with a drive current to rotate the rotor.

Each disk is formed of a solid disk-shaped base or substrate, having a hole in the center for the spindle. The substrate is commonly aluminum, although glass, ceramic, plastic or other materials are possible. The substrate is coated with a thin layer of magnetizable material, and may additionally be coated with a protective layer.

Data is recorded on the surfaces of the disk or disks in the magnetizable layer. To do this, minute magnetized patterns representing the data are formed in the magnetizable layer. The data patterns are usually arranged in circular concentric tracks, although spiral tracks are also possible. Each track is further divided into a number of sectors. Each sector thus forms an arc, all the sectors of a track completing a circle.

A moveable actuator positions a transducer head adjacent the data on the surface to read or write data. The actuator may be likened to the tone arm of a phonograph player, and the head to the playing needle. There is one transducer head for each disk surface containing data. The actuator usually pivots about an axis parallel to the axis of rotation of the disk(s), to position the head. The actuator typically includes a solid block surrounding the axis having comb-like arms extending toward the disk (which is, for this reason, sometimes referred to as the "comb"); a set of thin suspensions attached to the arms, and an electro-magnetic motor on the opposite side of the axis. The transducer heads are attached to the end of the suspensions opposite the comb, one head for each suspension. The actuator motor rotates the actuator to position the head over a desired data track (a seek operation). Once the head is positioned over the track, the constant rotation of the disk will eventually bring the desired sector adjacent the head, and the data can then be read or written. The actuator motor is typically an electromagnetic coil mounted on the actuator comb and a set of permanent magnets mounted in a stationary position on the base or cover; when energized, the coil imparts a torque to the comb in response to the magnetic field created by the permanent magnets.

Typically, a servo feedback system is used to position the actuator. Servo fields identifying the data tracks are written on at least one disk surface, usually at the time of manufacture. Older disk drive designs often employed a dedicated disk surface for servo fields. Newer designs typically use embedded servo sectors, i.e., servo sectors are recorded at angularly spaced portions of each disk surface, the area between servo sectors being used for recording data. The embedded servo field typically comprises a synchronization portion, a track identifying portion for identifying a track number, and a track centering portion for locating the centerline of the track. When operating in a seek mode, the servo system causes the transducer to read the track identifying portion to determine the current track number, and adjusts the actuator trajectory accordingly. When operating in a track following mode, the servo system causes the transducer to read both track identifying portion and track centering portion, to determine a deviation from the desired track centerline, and the servo feedback system adjusts the position of the actuator to minimize the deviation.

The transducer head is an aerodynamically shaped block of material (usually ceramic) on which is mounted a magnetic read/write transducer. The block, or slider, flies above the surface of the disk at an extremely small distance (referred to as the "flyheight") as the disk rotates. The close proximity to the disk surface is critical in enabling the transducer to read from or write the data patterns in the magnetizable layer. Several different transducer designs are used. Many current disk drive designs employ a thin-film inductive write transducer element and a separate magneto-resistive read transducer element. The suspensions actually apply a force to the transducer heads in a direction into the disk surface. The aerodynamic characteristics of the slider counter this force, and enable the slider to fly above the disk surface at the appropriate distance for data access.

Description of Major Components

Referring to the Drawing, wherein like numbers denote like parts throughout the several views, FIG. 1 is a simplified drawing of a rotating magnetic disk drive storage device 100, for use in accordance with the preferred embodiment. Disk drive 100 comprises rotatable disks 101, which are rigidly attached to hub assembly or spindle 103, which is mounted on disk drive base or housing 104. Spindle 103 and disks 101 are driven by a drive motor at a constant rotational velocity in the counter-clockwise direction, when viewed from above as shown in FIG. 1. The drive motor (not visible in FIG. 1) is contained within hub assembly 103. Data is recorded on the top and bottom surfaces 102 of each disk. Actuator assembly 105 is situated to one side of disks 101. Actuator 105 rotates through an arc about shaft 106 parallel to the axis of the spindle, driven by electromagnetic motor 107, to position the transducer heads. A cover (not shown) mates with base 104 to enclose and protect the disk and actuator assemblies. Electronic modules for controlling the operation of the drive and communicating with another device, such as a host computer, are mounted on circuit card 112. In this embodiment, circuit card 112 is shown mounted outside the enclosure formed by base 104 and the cover.

However, the card 112 could also be mounted inside the head/disk enclosure, or a portion of the electronics may be mounted inside the enclosure, while another portion is mounted outside the enclosure. A plurality of head/suspension assemblies 108 are rigidly attached to the prongs of actuator 105. An aerodynamic slider 109 with a read/write transducer 110 is located at the end of each head/suspension assembly 108 adjacent disk surface 102.

While disk drive 100 is shown with two disks having multiple disk surfaces for recording, it should be understood that the present invention could utilize a drive having a single disk, or having a larger number of disks, and that it would be possible to employ only a single disk surface of a disk for recording data.

Figure 2:
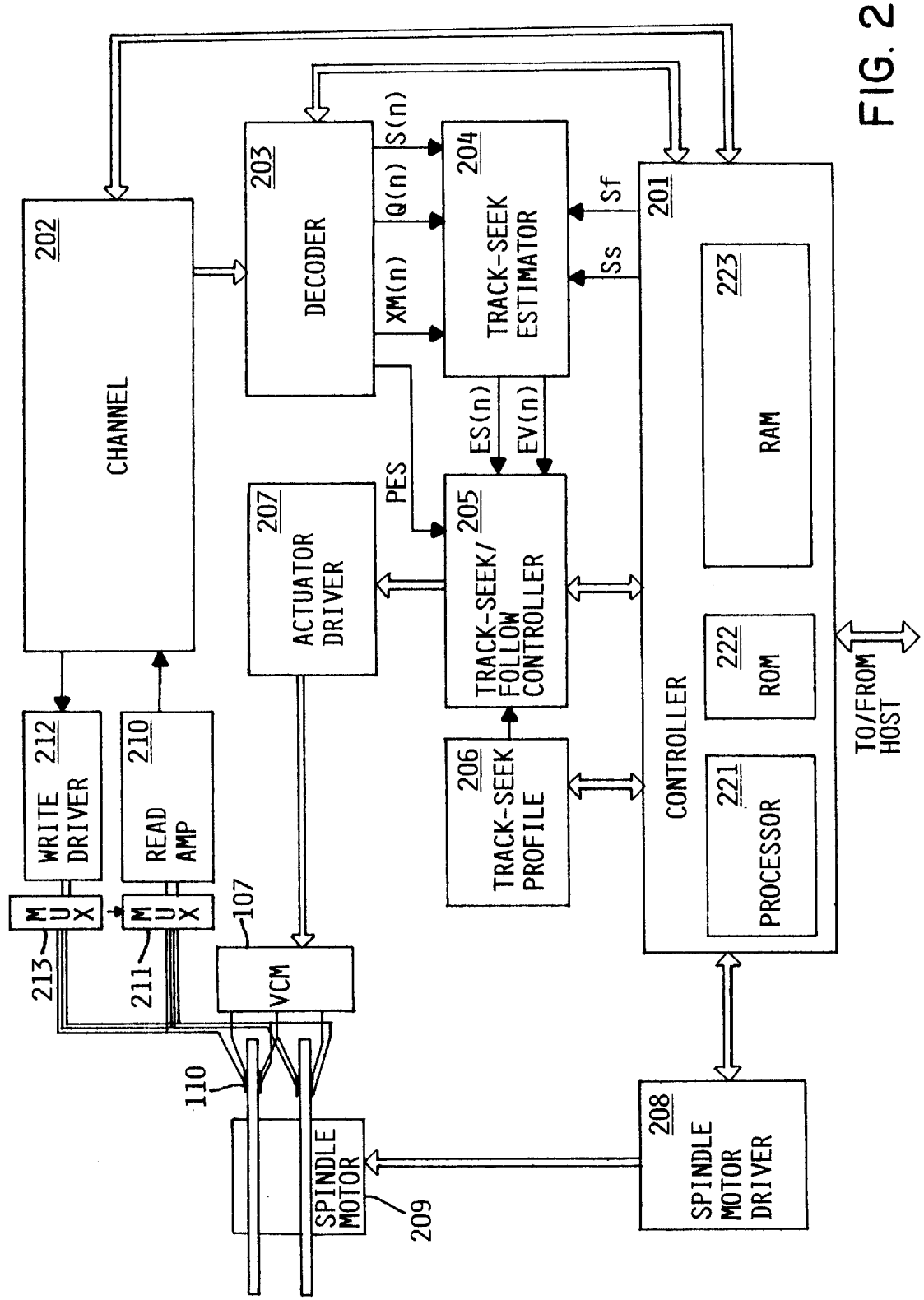
FIG. 2 is a high level diagram of the major electronic elements of a disk drive storage device, according to the preferred embodiment.

FIG. 2 is a high-level diagram of the major electronic elements of disk drive 100, showing how these are connected to one another and to the transducer heads, actuator motor and spindle motor, according to the preferred embodiment. File controller 201 provides a data interface to a host. The "host" is usually a computer system such as a desktop computer system or a mainframe computer system, although it may be a special purpose device such as a personal digital assistant (PDA), a digital controller for machinery such as an automobile or robot, or any of various other digital devices. Controller 201 also provides general control of the operation of disk drive 100, including such functions as command interpretation, sector mapping, power-up routines, diagnostics, error recovery, etc. Channel electronics 202 provides modulation and demodulation function for data being written to and read from the disk surface. A servo system interprets servo signals obtained from reading servo fields on the disk to control the actuator motor (VCM 107); it also responds to seek signals from file controller 201. In the preferred embodiment, the servo system comprises decoder 203, track-seek estimator 204, track seek/follow controller 205, track-seek profile 206, and actuator driver 207. Spindle motor drive circuitry 208 provides drive current to spindle motor 209, driving the motor at a desired rotational velocity.

Transducers 110 are attached via lead wires to write multiplexer 213 and to read multiplexer 211, which are in turn coupled to write driver 212 and read amplifier 210, respectively. Read amp 210 provides input to channel electronics 202. Channel electronics provides input to write drive 212. Multiplexers 211 and 213 select one of the heads for writing or reading, responsive to control signal 214 from file controller 201. Magnetic patterns representing data or servo signals are sensed by magneto-resistive read elements in transducers 110, amplified by read amp 210, and provided to channel electronics 202. Channel electronics preferably includes a partial-response maximum likelihood (PRML) filter for decoding data signals into coherent data for use by a host system. When writing data, channel electronics 202 encodes data according to a pre-determined encoding format, and provides this data to write driver 212, which in turn drives current through an inductive write element to cause the data to be written on the disk surface. Positioning of transducers 110 is achieved by a servo feedback loop system comprising transducers 110, read amp 210, channel electronics 202, the servo system (i.e., decoder 203, track-seek estimator 204, track seek/follow controller 205, track-seek profile 206, and actuator driver 207), and actuator motor 107. Transducers 110 read servo fields recorded at periodic intervals on disk surfaces 101; these are amplified by read amp 210; channel electronics 202 separate the servo fields from user data; decoder 203 decodes servo signals received from channel 202 to produce a position error signal (PES) and various track identifying data. Track-seek estimator 204 determines the current track number from the track identifying data decoded by decoder 203. Track-seek profile 206 provides an idealized profile for a seek operation. Track seek/follow controller uses data from decoder 203, track seek estimator 204, and track-seek profile 206 to compare current actuator state with desired state, and produce and output corresponding to drive current needed for the actuator. Actuator motor drive circuitry 207 in turn provides drive current to actuator voice coil motor (VCM) 107, positioning actuator 105 to a desired location (follow mode) or accelerating/decelerating the actuator in accordance with a desired profile (seek mode). The operation of the servo system in accordance with the preferred embodiment is described in greater detail herein.

File controller 201 preferably includes programmable processor 221 which executes a control program resident in read-only memory (ROM) 222. ROM 222 is a non-volatile semiconductor random access memory, the contents of which are not lost when disk drive 100 is powered down. File controller also includes volatile read/write memory (RAM) 223. RAM 223 is used as a temporary cache for data being read from and written to one or more of the disk surfaces. RAM 223 is also used for storing internal state variables necessary for drive operation.

Although certain disk drive features are shown and described above, in particular separate magneto-resistive read and inductive write transducers elements, it should be understood that these are by way of describing the preferred embodiment only, and it would be possible to practice the present invention using different transducer elements or other alternative disk drive design features. It should further be understood that various electronic components such as file controller 201, channel 202 and decoder 203, track-seek estimator 204, etc. are shown in FIG. 2 as distinct entities for illustrative purposes, and that one or more of these may be combined as a single module, or may be embodied in multiple modules. In particular, elements of the servo system may in fact be implemented as a single module, or may be implemented as portions of a control program executing on a common programmable processor and stored in a common memory, as shown in processor 221 and ROM 222 of file controller 201.

Servo Field Description

Figure 3:
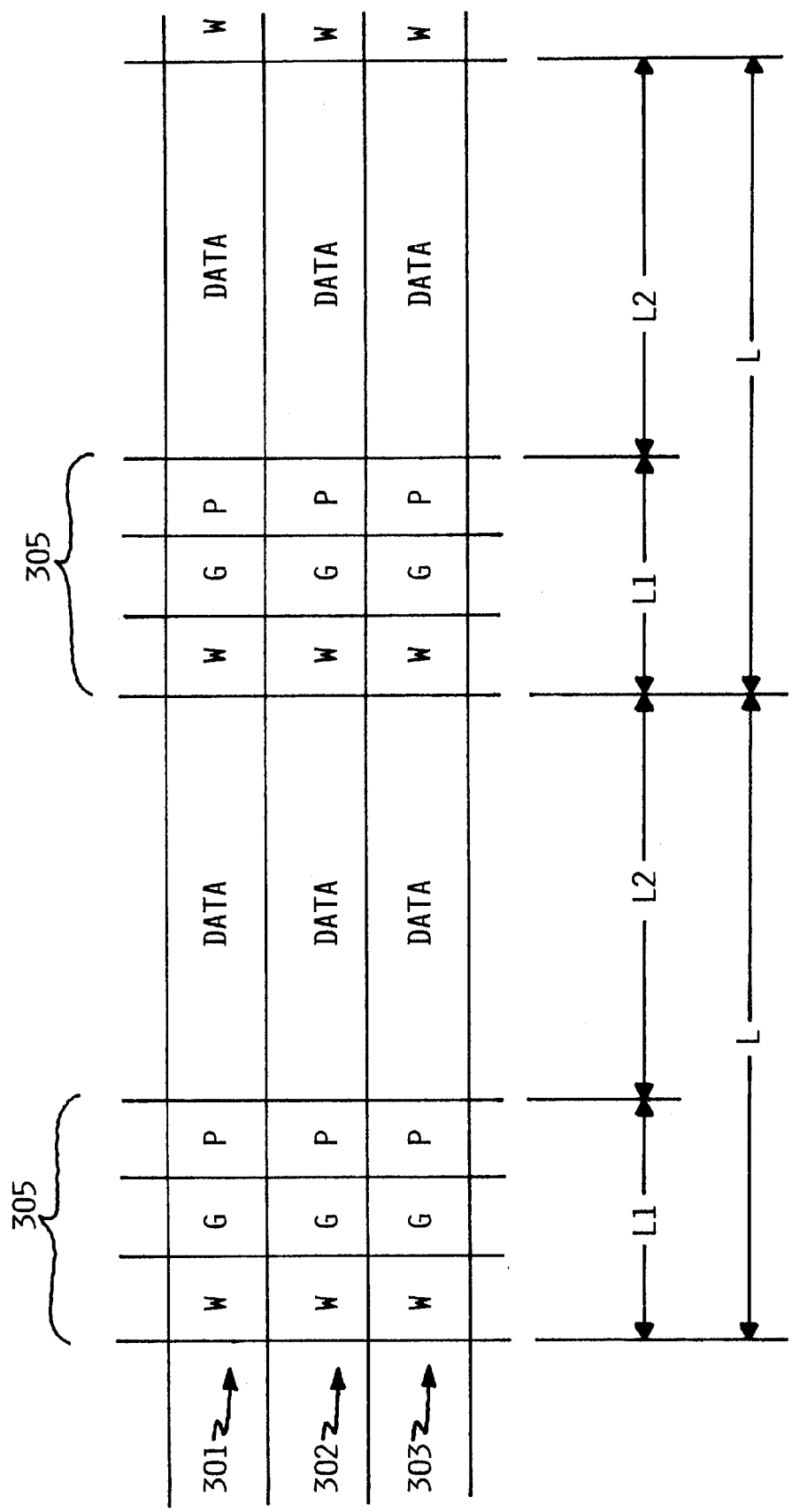
FIG. 3 illustrates a typical prior art embedded servo field format recorded on the surface of a disk.

A disk drive using a conventional embedded servo field reads a servo field at angularly spaced intervals on the surface of a disk. The area between each servo field is used for storing user data. FIG. 3 illustrates a typical prior art embedded servo field format. As shown in FIG. 3, a plurality of elongated recording tracks lie adjacent each other. These tracks are shown for illustrative purposes in FIG. 3 as straight, parallel tracks 301–303, it being understood that in fact the tracks are concentric rings having a common center, i.e., the axis of rotation of the disk. Each servo field 305 contains three portions or sub-fields: a synchronization or write-recovery field (W), a track identifier field (G), which is typically a Gray code encoding of a track number, and a position error field (P). As the disk is rotated by the spindle motor, the transducer head passes over the disk in a direction from left to right in FIG. 3, and therefore reads the servo fields in the order W, G and P.

The synchronization field typically contains a single high-frequency pattern. A modern disk drive typically contains a dual element transducer, having a magneto-resistive read element and a thin-film inductive write element, which are physically sandwiched in close proximity. When data is being written by the write element, the read element and associated read channel amplifiers are saturated. The synchronization field allows the real element and channel sufficient time to recover from data writing, hence it is also called a write-recovery field. The high frequency pattern is also used to for synchronization of recording channel timing circuits.

The track field contains a q-bit binary code identifying a track. A Gray code is typically used, the Gray code having the property that, between any two adjacent tracks, the q-bit track identifiers differ from each other by only a single bit. The number of possible code combinations (M) is typically $2^q-1$. The Gray code is formatted such that the Gray code can be read on the fly while the transducer head is moving fast (seeking) between tracks over the rotating disk surface, as well as be read in track following mode. In addition to a track number, the track field may contain other information, such as a head number, a servo sector number, or an error correcting code (ECC), which can bring the total length to as much as 24 bits or more.

The position error field contains a coded pattern from which the channel and servo system derive a position error signal, indicating a deviation of the transducer head from track centerline. Various patterns are known in the art, e.g., the A-B-C-D pattern illustrated in FIG. 4 of U.S. Pat. No. 6,075,667 to Kisaka et al., herein incorporated by reference, it being understood that other patterns could alternatively be used.

The servo interval length L between the start of one servo sector and the start of the next servo sector is preferably the same for all servo sectors 305. This interval length is approximately the length L1 of the servo field plus the length L2 of the data. For clarity of illustration, L, L1 and L2 are not to scale in FIG. 3. Typically, L1<0.1 L. Typically, the length of the fields W, G and P are of approximately equal length. Additionally, it should be understood that the track widths are exaggerated with respect to L, L1 and L2 in FIG. 3.

In a conventional servo field, the track field (Gray code) contains sufficient bits to express a full track number. This means that where there are, e.g., 12,000 tracks recorded on the surface of a disk, 14 bits in the Gray code will be needed to record a track number. If ECC and/or other information is contained in the track field, additional bits will be needed for these.

When operating in a track following mode, the drive reads the track number each time the head passes over a servo field containing the Gray code. This is highly redundant information, for the drive knows the track number from the servo field. But suppose there is some movement of the actuator. It will be observed that there are practical physical limits to the momentary acceleration of an actuator. By taking certain state variable which define a state of an actuator at a time t, is possible to estimate the position of the actuator at a time t+Δt within some range. In particular, if Δt is the period required for the transducer head to pass the distance L from one servo sector to the next, it is possible to estimate the track number position of the transducer head at time t+Δt within a relatively small range of track numbers, given its track position at time t and its velocity at time t. This observation can be used to advantage to reduce the size of the Gray code, by reducing the number of bits q used to express a track number. I.e., if a track number is expressed within the small range of track numbers using p bits, where p<q, and the range of track numbers is estimated from the state variables as noted above, this information collectively will be sufficient to derive the complete track number.

Figure 4:
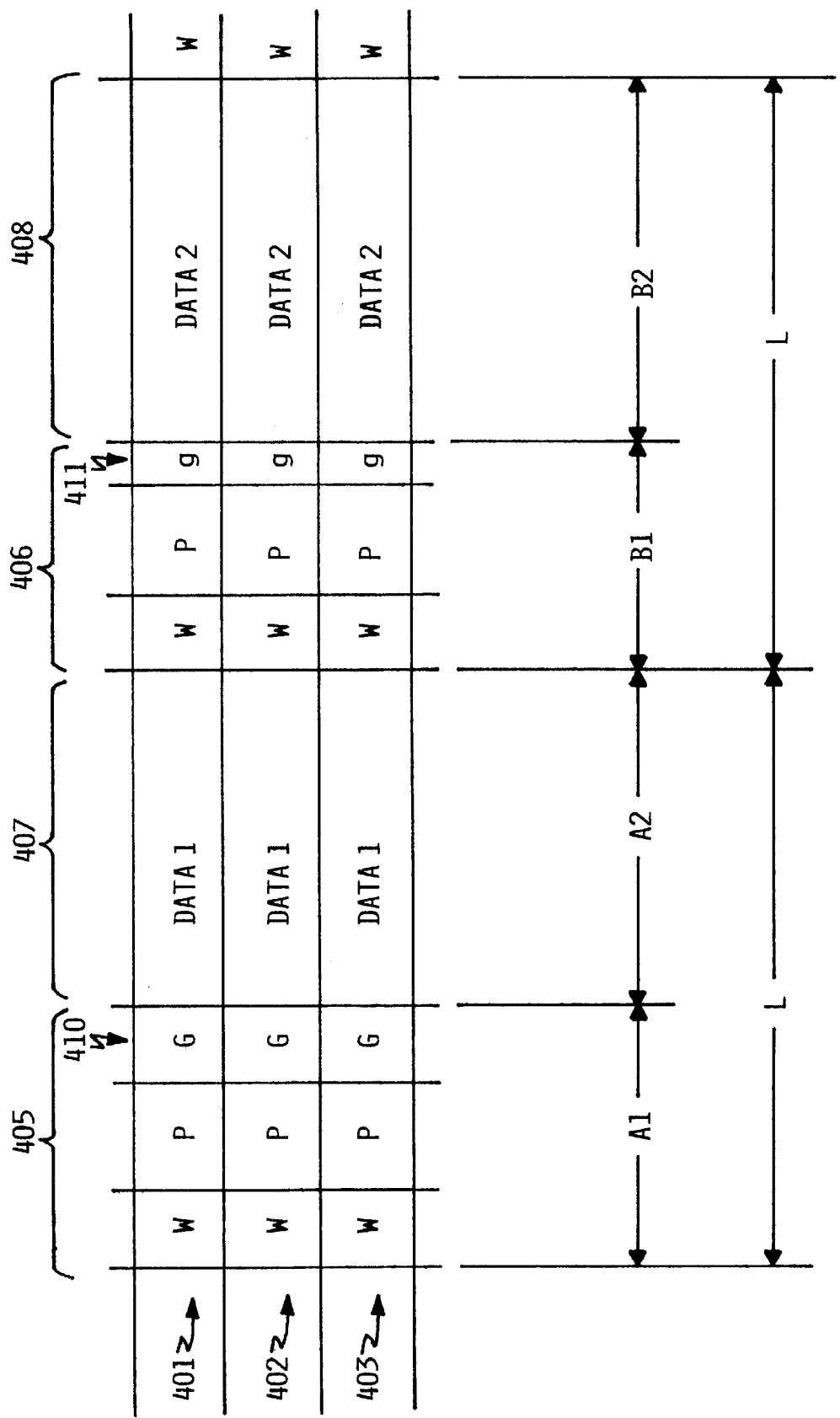
FIG. 4 illustrates the formatting of servo fields using two different servo field types, according to the preferred embodiment.

In the preferred embodiment, two different servo field formats of differing length are employed. FIG. 4 illustrates the formatting of tracks 401–403 using two different servo field types. FIG. 4 is intended to show different types of servo fields for illustrative purposes, and it should be understood that, as in the case of FIG. 3, the drawing is not to scale, and tracks are actually concentric rings rather than parallel lines.

As shown in FIG. 4, in a first format 405, the servo field contains a conventional track field having a full Gray code (G) 410 which stores a full track number as a q-bit code. In a second format 406, the servo field contains an abbreviated track field having an abbreviated Gray code (g) 411, which stores a portion of a track number as a p-bit code, where p<q. I.e., the abbreviated Gray code is a p-bit Gray code encoding of the full track number modulo M. The range of M could be $2^p$, or could be $2^p-1$, or could be some lesser number. Both types of servo field contain a synchronization or write-recovery field, and a position error field. These fields perform the same function as the corresponding conventional fields of FIG. 3.

In the preferred embodiment, although servo fields 405 and 406 are of differing length (designated A1 and B1), the interval L from the start of one servo field to the start of the next servo field is constant. This necessarily means that the data field 407 following a longer servo field 405 is shorter than the data field 408 following a shorter servo field 406, i.e., since A1+A2=L, B1+B2=L, and A1>B1, then A2<B2. It will further be noted that, in the preferred embodiment, the position error field is located immediately after the synchronization field, with the track field following the position error field. This arrangement provides a constant interval L from the start of any field within a servo sector to the start of the corresponding field in the successive servo sector. Because the disk rotates at a constant velocity, a constant interval L translates to a constant frequency for reading the various servo fields. Such a constant frequency is preferred in order to simplify the channel timing circuits. It would alternatively be possible to locate the track fields between the synchronization fields and position error fields, as is done in FIG. 3, or to otherwise vary the interval L.

The shortening of the track fields in certain servo sectors 406 frees up some space on each track 401–403. In the preferred embodiment, this additional space is used to expand the length of the position error fields, thus improving the PES signal-to-noise ratio, as explained below. However, it alternatively would be possible to simply use this extra disk area for writing additional data. I.e., leaving the W and P fields unchanged over a conventional servo field format of FIG. 3 and the track width constant, the DATA2 field 408 following each short servo field 406 can simply be expanded to accommodate additional data, thus increasing the amount of data stored in the drive. As a further alternative, it would be possible to use a combination of these techniques, both using some of the additional space to expand the position error field, and other space for expanding some of the data fields. Ultimately, a higher PES signal-to-noise ratio can be used to increase track density (reduce track width), and thus also to increase the amount of data stored on a drive. Which of these techniques ultimately results in greater benefits is a matter of design choice.

While it would be possible to simply alternate longer and shorter servo fields 405, 406 on each track, it is generally not necessary to read the full track number from the track identification field this often. In the preferred embodiment, the longer servo field 405 containing a track identification field having a full Gray code is repeated only at intervals of N servo sectors, while all sectors in between are of the shorter variety 406. Preferably, N is some factor of the total number of servo sectors per revolution of the disk, e.g., a disk may have 96 servo sectors, and N=16. In the extreme case, it would be possible for N to equal the number servo sectors, so the a full track identifier is encountered only once per disk revolution. In the preferred embodiment, N is chosen equal to M, where M is the number of different Gray code combinations in the abbreviated Gray code field 411.

If the entire additional space saved by the abbreviated Gray code is used to expand the position error field (P), and if N=M as assumed above, and certain other assumptions are made, it is possible to derive an analytical expression for the increased length of the P field. It is assumed that the length of field 410 ($L_G$) is the same as the length of the W field ($L_W$), which is the same as the unexpanded P field of FIG. 3, and therefore, in the conventional system of FIG. 3, the collective length of N servo sectors is $3N*L_W$. In the servo system of FIG. 4, this collective length is $N*L_W+N*L_P+L_G+(N-1)*Lg$, where Lg is the length of abbreviated field 411 and $L_P$ is the length of the expanded P field. If the collective lengths of the servo fields in both cases is held constant, the analytical expression for $L_P$ then becomes:

$$L_P=[(2-1/N)-(Lg/L_G)*(1-1/N)]*L_W \quad [1]$$

It is further assumed that the full Gray code field 410 contains 24 bits (14 bits of track identifier and 10 bits of ECC), and that the abbreviated Gray code field contains p bits of track identifier plus one parity bit, i.e., $N=M=2^p=2^{(Lg-1)}$. One may then compute $L_P$ as a ratio of $L_W$ using equation [1]. The table below summarizes the results of such computation for various values of Lg.

| Lg (Gray + Parity) | M (# Gray Code Words) | $L_P/L_W$ |
|---|---|---|
| 3 | 4 | 1.656 |
| 4 | 8 | 1.729 |
| 5 | 16 | 1.742 |
| 6 | 32 | 1.727 |
| 7 | 64 | 1.697 |

Based on the assumptions above, $L_P/L_W$ reaches a maximum value of 1.742 for Lg=5 bits. Therefore, in the preferred embodiment, the abbreviated Gray code field 411 contains 4 data bits and one parity bit, and N=M=16. The full Gray code field 410 contains 14 data bits identifying the full track number, and 10 bits of ECC.

For the assumptions above stated, at N=M=16, and Lg=5 bits, $L_P=1.742 L_W$. In other words, if the entire disk space saved by using an abbreviated Gray code field as described above is used for extending the position error field, and other factors are held constant, the position error field can be lengthened by a factor of 1.742. It is known from statistical averaging that the standard deviation of noise in a sequence is inversely proportional to the square root of the number of samples. Increasing the length of the position error field results in a proportional increase in number of samples at a constant sampling rate. If the standard deviation of noise using the conventional servo format of FIG. 3 is SIGMA, then the standard deviation of noise using the improved servo format of FIG. 4, having a position error field approximately 1.742 times the length of the conventional position error field, is SIGMA/sqrt(1.742). This corresponds to an improved signal-to-noise ratio of approximately 2.41 dB. This improved signal-to-noise ratio is obtained without any other changes to the disk hardware, recording density, or other parameters.

In the preferred embodiment, M (the number of different abbreviated Gray code values) is chosen equal to N (the interval of full track identifier Gray codes among servo sectors). These values need not necessarily be equal, and in an alternative embodiment, they are not equal. However, in making design choices in a disk drive, there is a design dependency involving these two values, i.e., in general, a larger value of M allows the designer to use a larger N. Specifically, the track estimation process described herein can be likened to dead reckoning navigation, in which the true position of the actuator is verified only at intervals of N servo sectors. There is some possibility that as a result of shock, vibration, or some other circumstance, the estimator will become "lost" and not know the true actuator position. A larger M reduces the probability that the actuator will become "lost" in a seek operation or otherwise, and increases the certainty that the correct track has been identified during seek settle; a larger N increases this probability of being lost and/or increases the time to recover from a lost situation or verify correct track during settle. Without this dependency, it would superficially appear that maximum gain in disk area could be obtained by using a smaller M and a larger N. As explained herein, this is not necessarily so because a smaller M may dictate a smaller N, and therefore reduce the gain in available disk area.

FIG. 5 is a table showing Gray code encodings for field 411 using a single parity bit and 4 track identifying bits. FIG. 5 illustrates encodings for M=16 and M=15. By using M=15, a Gray code of all zeroes can be avoided, although this can also be accomplished by using a parity bit. Since fewer bits are used in the abbreviated Gray code than in the conventional Gray code, the probability of a single bit error is decreased over the conventional full length Gray code. On the other hand, the conventional Gray code has an error correction code (ECC) to enable errors to be corrected on the fly. The parity bit in the abbreviated Gray code will detect a single bit error, but can not correct it on the fly. If, for performance reasons, the capability to correct an abbreviated Gray code is desired, an additional two bits could be added to provide an ECC, i.e., the abbreviated Gray code would contain 4 bits of track identifier and 3 bits of ECC. This Gray code will not produce as great a signal-to-noise improvement, but it will generally allow any errors to be corrected on the fly.

Operational Overview

In most respects, a disk drive in accordance with the preferred embodiment of the present invention operates like any conventional disk drive. I.e., the drive accesses data on the surfaces of rotating disks, and uses the servo system to determine actuator position for purposes of accessing data. The embedded servo sectors are read at predetermined constant intervals. The synchronization, or write recovery field, and the position error field, are used in the conventional manner, although, as explained above, the position error field of the preferred embodiment is somewhat longer, facilitating a PES having an improved signal-to-noise ratio.

The chief operational difference lies in the determination of track identity. In a conventional disk drive, a full track number is read every time the head passes over a servo sector, whether in track seek or track following mode. In accordance with the preferred embodiment, the full track number is only read from some of the embedded servo sectors. When the head passes over a servo sector having an abbreviated Gray code (containing only a portion of the track number), the full track number is determined as described herein. Once the full track number is determined, the track number is used by the drive just as if it had been read from the servo field in a conventional drive.

There are two primary modes of actuator operation: seek and follow. In a track seeking mode, the actuator is moved rapidly to a different (and possibly distant) track. In a track following mode, the actuator is maintained on the center of a track to access data on the track.

The derivation of a full track number while operating in a seek mode is the more difficult problem, and is explained below. The derivation of a track number when operating in track following mode is relatively straightforward. In track following mode, the actuator is more or less stationary as it reads successive servo sectors. The position error field is used to position the actuator on the center of the track being followed. Any deviation from track center is corrected as each servo sector is read. The interval between servo sectors, actuator inertia, aerodynamic forces, and other drive characteristics are designed so that, under normal operating circumstances, the actuator will not drift more than a small fraction of the track width during the interval between any two servo sectors. Therefore, in general the track number stays the same. Since the full track number is read every Nth servo sector (in the preferred embodiment, every $16^{th}$ servo sector), this number is known. The servo system need only verify by reading each abbreviated Gray code that the portion of the track number (i.e., the track number modulo M) has not changed.

Under unusual circumstances, and particularly in the event of an external shock to the drive, there may be a movement of the actuator to a different nearby track. In this case, the abbreviated Gray code will change (i.e., the track number modulo M will change). This indicates that the actuator is no longer following the desired track, and the drive would typically suspend any data access operations, and enter a different mode of operation, such as an error recovery mode, to counter the effect of any disturbance and bring the actuator back to the correct track. In this case, the actual track number may be determined using the seek algorithm described below.

For most disk drive designs, it is considered physically impossible that the actuator could be accelerated sufficiently to move from essentially a stationary state by more than a few tracks in the interval of a single servo sector, and in particular, to move as much as 16 tracks (in which case, the abbreviated track number would be the same, and the servo system may assume the actuator is still following the track). Very large g forces would be required to produce such an acceleration, and such forces, if present, would likely damage other components. Therefore, the use of the abbreviated Gray code is sufficient as a track identifier and detection mechanism for unusual movement of the actuator when operating in the track following mode.

Track Seek Operation

Unlike the case of a track following mode of operation, during a seek operation it is common for the actuator to move by more than M tracks in the interval between servo sectors. However, the inertia of the actuator is constant, and therefore the above observations with respect to acceleration can be applied to determine track position during a seek operation. The disk spins at a constant velocity, bringing the head over each successive servo sector at a constant time interval ($\Delta t$), and it is virtually impossible to radially accelerate the actuator by more than a few tracks/$(\Delta t)^2$. In the preferred embodiment, the track number at time t+$\Delta t$ is computed by iteratively assuming a track number at time t+$\Delta t$, using this assumption to calculate a simplified estimate of actuator acceleration during the time interval $\Delta t$, and comparing the calculated estimate of acceleration to some pre-determined threshold, until an assumed track number value is found which brings the calculated acceleration within the pre-determined threshold.

Figure 6:
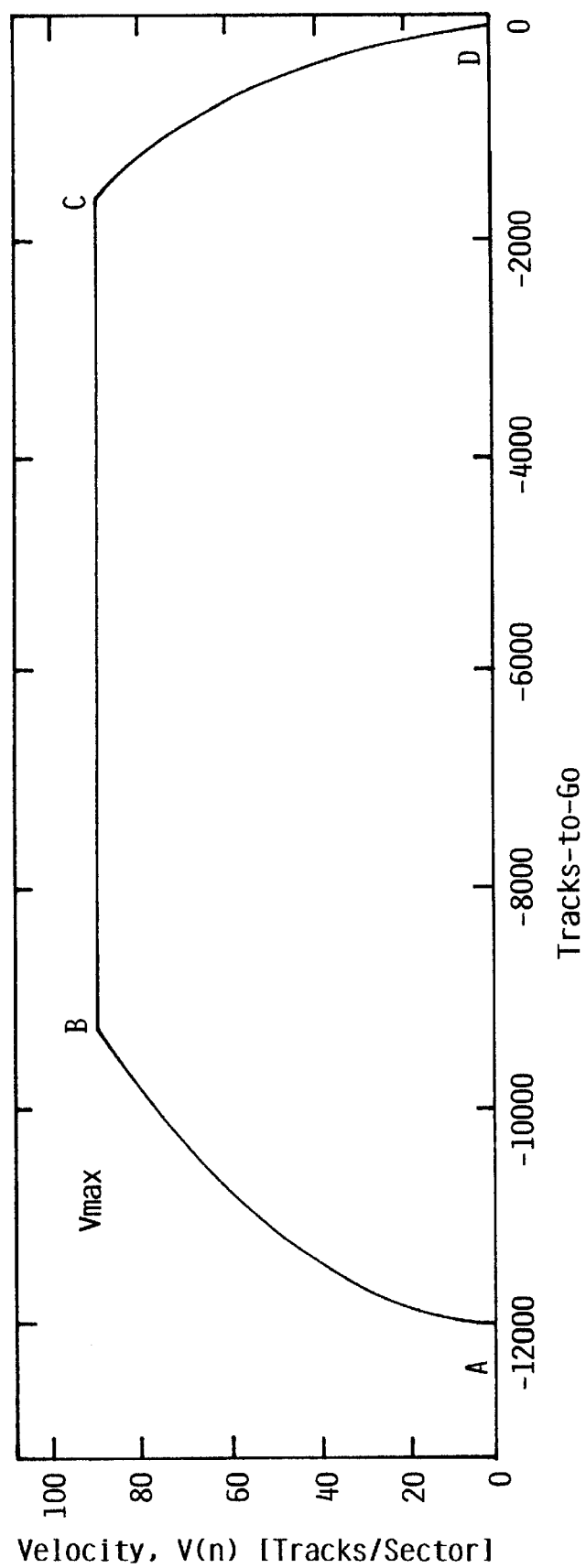
FIG. 6 illustrates a typical seek-trajectory profile for a "long seek" of an actuator, according to the preferred embodiment.

The track seek operation ideally follows a per-determined seek-trajectory profile in the position-velocity plane. FIG. 6 illustrates a typical such seek-trajectory profile for a "long seek", i.e., a seek operation in which the actuator reaches an upper limit of velocity. The abscissa represents the number of tracks to go, or the remaining length of the track seek in number of tracks. As can be seen, the trajectory curve has been divided into three segments: A-B, B-C and C-D. The A-B segment of the curve is the acceleration portion. While accelerating, the actuator motor is typically driven in open loop mode with maximum current, to accelerate the actuator as quickly as possible. When the actuator reaches some pre-determined maximum velocity Vmax, the actuator control switches to a constant velocity mode. In constant velocity mode, the servo system operates in a closed-loop control to maintain the velocity at Vmax. Actuator velocity is typically limited to Vmax in order to contain damage if the servo system should lose control and allow the actuator to hit one of the crash stops which limit its arc of travel. At point C, the actuator control switches to deceleration mode. In deceleration, the system also operates in a closed-loop control to hold deceleration to the pre-determined profile. The deceleration segment C-D is usually shorter than the acceleration segment A-B, because the deceleration force is aided by the back electromagnetic force (emf) of the actuator motor. As the track seek becomes shorter, the B-C segment is accordingly shortened. During short seeks, the maximum velocity Vmax is never attained. This can be visualized as the B-C segment disappears entirely, and the A-B segment slides to the right and intersects the C-D segment.

In order to adhere to the desired seek profile, the servo system controlling the actuator must be able to determine the current track number using the embedded servo information. By comparing current track number with previous track number or numbers, an estimate of velocity can be obtained. By comparing current track number with the target track of the seek operation, the number of tracks to go can be determined. This information is then compared with the desired profile illustrated in FIG. 6 to determine any adjustment required to actuator velocity. In conventional drives, each embedded servo sector contains track identification field encoding a complete track number, and techniques for following the seek profile, given the track number information, are known in the art, and are not described in further detail herein. According to the preferred embodiment of the present invention, the servo system determines the track number using the servo field formats described earlier and illustrated in FIG. 4, and uses the track number thus determined to follow the seek profile in any conventional manner.

In accordance with the preferred embodiment, a track-seek estimator 204 (which may be simply a routine in software executing on a programmable processor, or may be hardware circuits or a combination of hardware and software) has five inputs: the modulo-M track number XM(n), the servo sector number Q(n), the complete track number S(n), the starting track for a track seek operation Ss, and the final or target track for the track seek operation Sf. The track number modulo M is derived either from the abbreviated Gray code 411 or full Gray code 410, and is therefore available from every servo sector. The modulo-N servo sector number is a sequential number assigned to the servo sector, modulo N. By convention, a full track identification Gray code field 410 is contained in each servo sector having a modulo-N servo sector number of 0; all other servo sectors have the abbreviated track identification Gray code field 411. The complete track number S(n) is read whenever the head passes over a full Gray code field 410, i.e., when (Q(n) modulo N)=0. The quantities XM(n), Q(n) and S(n) are provided by decoder 203.

Track-seek estimator 204 provides two outputs to track seek/follow controller 205: the estimated full track number ES(n), and the estimated actuator velocity EV(n). Track-seek estimator 204 may also produce an error signal (ERR (m)) when a full track number read from a full Gray code field 410 does not coincide with the estimated track, indicating that the track estimator has somehow become lost. Track seek/follow controller 205 uses the EV(n), ES(n) and the desired seek profile 206 during a track seek operation. The PES from decoder 203 is used by controller 205 during the track follow operation. A combination of ES(n), EV(n) and PES is used during the track-settle operation, which is the transition between track seek and track follow mode. The track seek/follow controller 205 determines an actuator current required to drive the actuator, and provides a digital control signal output to actuator driver 207 representing the drive current. The driver converts this to an analog current output to the actuator motor 107.

Figure 7:
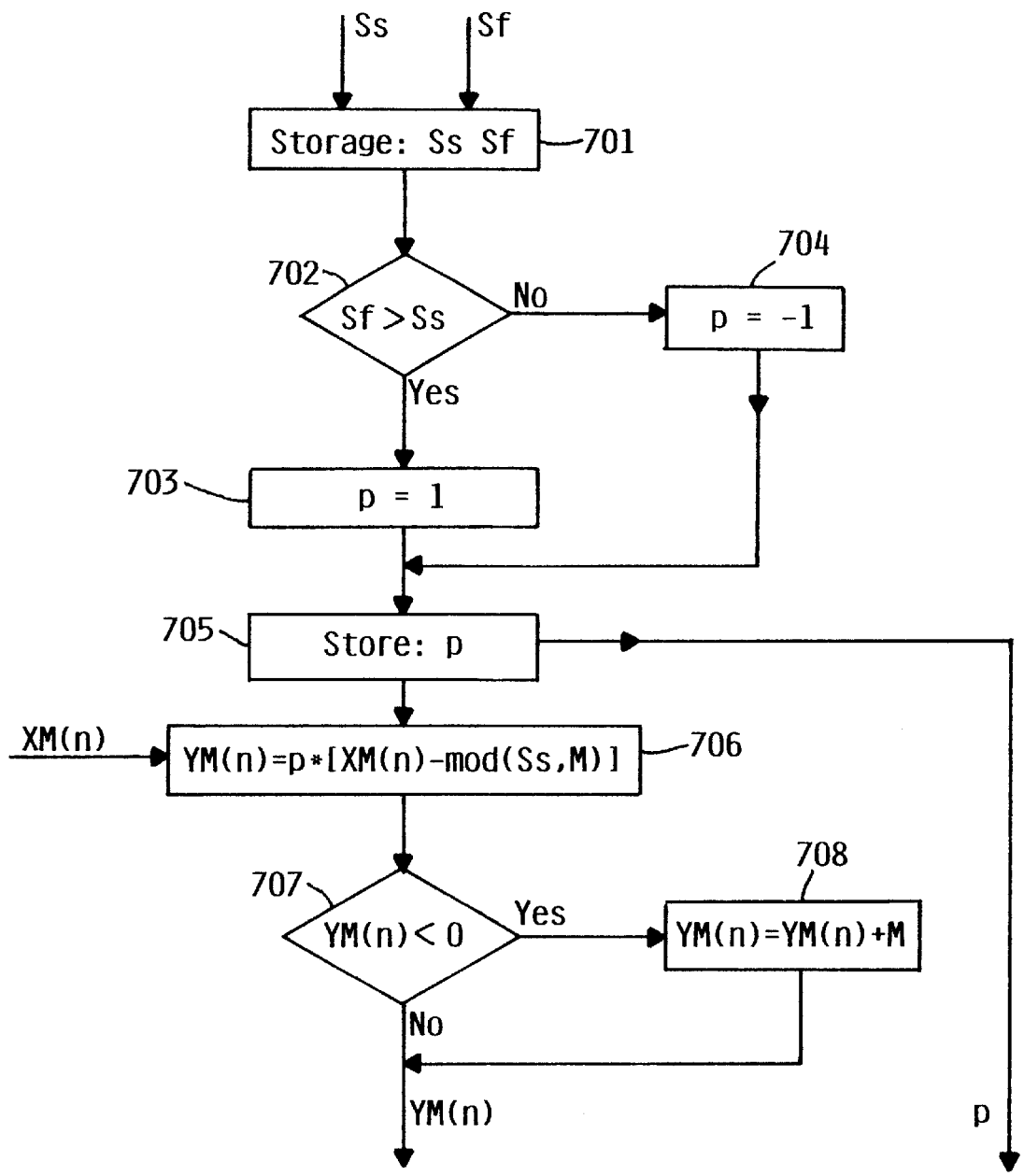
FIG. 7 is a process flow diagram illustrating the process of normalizing input values for track seek estimation, according to the preferred embodiment.

The track estimation function performed by track estimator 204 can be divided into two parts: a normalization process, and an estimation process. FIG. 7 is a flow diagram illustrating the normalization process. Normalization of input values, and in particular, the decoded abbreviated Gray code value XM(n), is performed to simplify certain downstream calculations. The track-seek estimator 204 receives and stores the starting track number (Ss) of the seek operation and the final or target track number (Sf) of the seek operation (block 701). The estimator then determines whether the seek operation is ascending (Sf>Ss) or descending (Sf<Ss) (block 702). If the track-seek is ascending, p is set to +1 (block 703); if descending, p is set to −1 (block 704). In either case, the value of p is stored for use in the estimation process described below (block 705). Steps 701–705 are performed once at the beginning of the seek, and need not be repeated.

With each successive servo sector read by the transducer, decoder 203 provides a new value XM(n) to track-seek estimator 204, XM(n) representing the current track number modulo M. As explained above, the abbreviated Gray code field 411 contains a direct encoding of this number. In the case where the transducer passes over a full Gray code field 410 (i.e., every Nth servo sector), the decoder provides the value from field 410, modulo M. In the preferred embodiment, M=16, and this value is simply the lower order four bits of the full decoded track number S(n). In the case where M is not a power of two, additional hardware or algorithmic steps could be used to derive S(n) modulo M from S(n). As described further herein, where the full track number S(n) is available from Gray code field 410, this full number is used rather than an estimate based on XM(n), and therefore XM(n) is not strictly necessary in this instance. However, in the preferred embodiment, the estimate derived from XM(n) is compared to the full track number S(n) for verification purposes.

When the transducer passes over a servo sector and a new value of XM(n) is provided by decoder 203, this value is normalized (at block 706) according to the equation:

$$YM(n)=p*[XM(n)-\mathrm{mod}(Ss,M)], \quad [2]$$

where mod(Ss,M) represents (Ss modulo M). Due to the nature of modulo arithmetic, YM(n) may be negative, and therefore, if YM(n) is negative (block 707), it is incremented by M and necessarily becomes positive (block 708). As output from the normalization process, YM(n) is a non-negative integer between 0 and (M−1) inclusive, representing the amount of track movement from the starting track, modulo M.

Figure 8A:
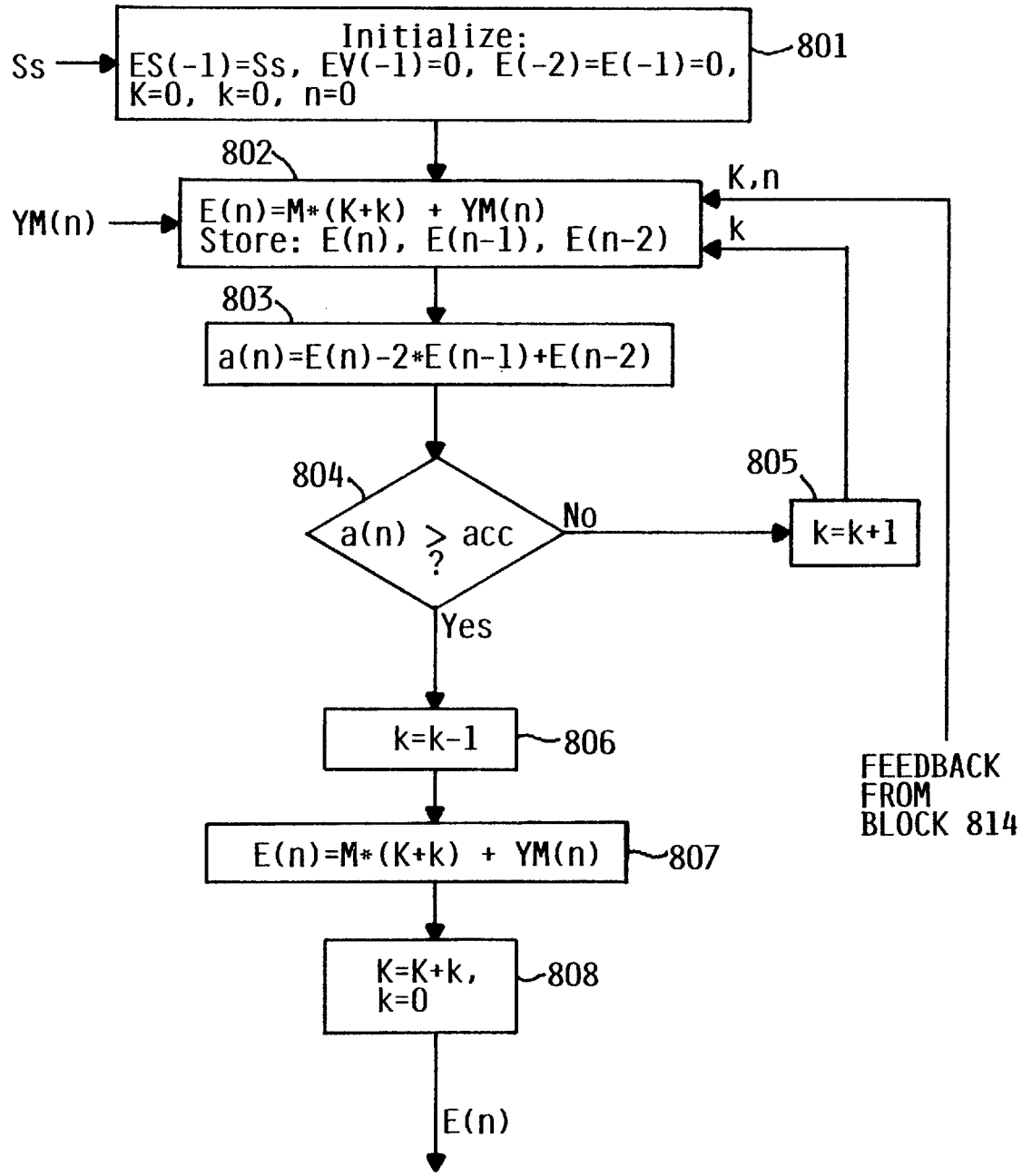
FIGS. 8A and 8B are a process flow diagram of the track estimation process, according to the preferred embodiment.
Figure 8B:
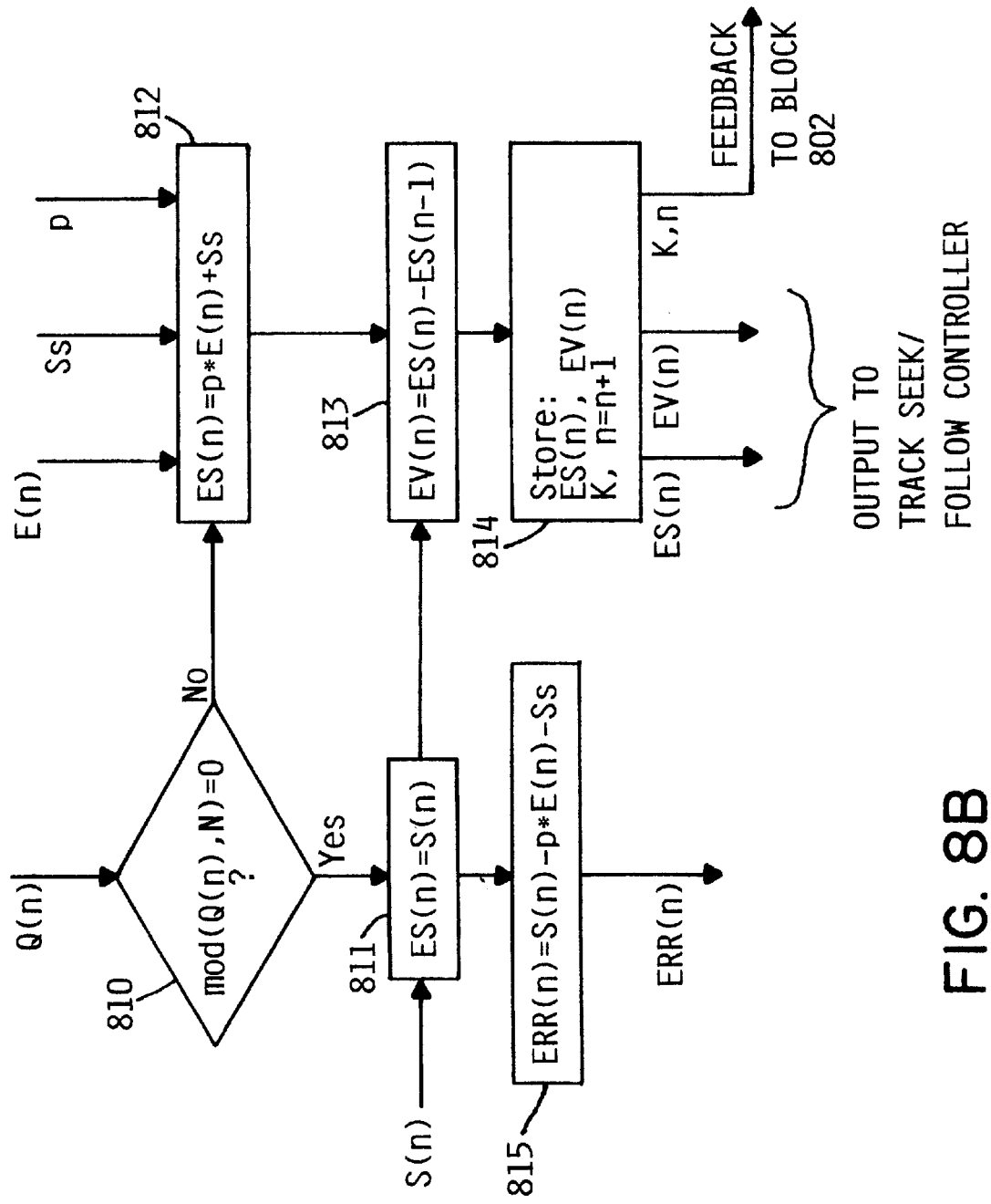

FIGS. 8A and 8B (collectively referred to herein as FIG. 8) are a flow diagram of the estimation process for estimating a track number using the normalized inputs from the normalization process of FIG. 7, and other inputs. At the beginning of a seek operation, various quantities are initialized (block 801). The quantity ES(−1), representing the estimated track position at servo sector −1, is initialized to Ss, the starting track number. The quantity EV(−1), representing the estimated velocity at servo sector −1, is initialized to 0. The quantities E(−2) and E(−1), representing normalized track number estimates (i.e., the absolute value of the distance in number of tracks that the actuator has traveled from the start of the seek operation) for servo sectors −2 and −1, respectively, are initialized to 0. The variables K, k and n are initialized to 0; K and k represent the higher order portion of the track number, while n is a servo sector counter.

As the transducer head passes over each successive servo sector, a new value YM(n) is derived in the normalization process from the value XM(n) received from decoder 203. The values of K and n are updated at the end of calculating the estimated position and velocity values for each servo sector. At block 802, these values are used to compute and store a tentative normalized track number for sample n, E(n), according to the equation:

$$E(n)=M*(K+k)+YM(n) \quad [3]$$

E(n) is an estimate of the distance (in number of tracks) that the transducer has traveled during the seek operation, and is always expressed as a positive number. At block 803, the estimator uses the tentative normalized track number E(n) to form a approximated estimate of the acceleration of the transducer head during the most recent servo sector interval (a(n)) according to the equation:

$$a(n)=E(n)-2E(n-1)+E(n-2) \quad [4]$$

The estimated acceleration a(n) is then compared with some predetermined acceleration limit, designated "acc" (block 804). The acceleration limit represents a probable upper limit of the acceleration that the actuator may experience, and would depend on various physical and other design characteristics. If the limit is not exceeded, the "N" branch is taken from block 804, the value of k is incremented by one (block 805), and blocks 802–804 are repeated, calculating a new value of E(n) and a(n) based on the updated value k. If the limit is exceeded, the "Y" branch is taken from block 804; the value of k is then decremented by one (block 806), and E(n) is recomputed according to equation [3] above using the updated value of k (block 807). The value of K is then set to K+k (which was the value used at block 807 for computing E(n), and k is reset to 0, for use in evaluating the next servo sector data (block 808).

The process steps explained above represent an iterative process for finding the best track number estimate. It is assumed for purposes of the algorithm than an acceleration in excess of the acceleration limit is impossible. The estimation process begins with a low value of k which produces a low value of E(n), i.e., one which assumes the least amount of actuator travel, and hence a low (and possibly negative) approximation of acceleration a(n). The process then iteratively increments the value of k by one (incrementing the value of E(n) by M) until the approximate acceleration a(n)

exceeds the limit. Since this value of k is clearly excessive, k is then decremented by 1, causing E(n) to be decremented by M, to produce the final normalized track number E(n). As a result, E(n) is the largest possible track number value which does not cause acceleration to exceed the limit.

The estimator then determines whether the modulo N value of the current servo sector number Q(n) is equal to 0, i.e., whether mod(Q(n),N)=0 (block 810). A zero value indicates that the current servo sector contains a full Gray code field 410, which decoder 203 decodes as a full track number S(n). If mod(Q(n),N)=0, ES(n), the estimated track number for the current servo sector, is set equal to the full decoded track number S(n) (block 811). If mod(Q(n),N)≠0, then the estimated current track number is derived from the normalized track number (block 812) according to the formula:

$$ES(n)=p*E(n)+Ss \quad [5]$$

In other words, the current track number (ES(n)) is the starting track number (Ss) plus the absolute value of the number of tracks traveled (E(n)) times the direction of travel (p).

After determining ES(n) according to either block 811 or 812, the estimated velocity EV(n) is determined (block 813) according to the formula:

$$EV(n)=ES(n)-ES(n-1) \quad [6]$$

The values of ES(n) and EV(n) are then stored and output to the track seek/follow controller 205 (block 814). Additionally, n is incremented, and K and n are stored for feedback input to the next track estimation (evaluation of the next servo sector).

If mod(Q(n),M)=0, then in addition to setting ES(n) at block 811, the track estimator then determines a difference between the track number computed according to equation [5] using the estimate E(n) and the track number S(n) decoded from the full Gray code field 410 in the servo field (step 815). The signal ERR(n) is that difference. A non-zero value of ERR(n) indicates that the track estimator has become lost, and the controller 201 and/or track seek/follow controller 205 may take appropriate recovery action.

FIGS. 9A and 9B (collectively referred to herein as FIG. 9) are a sample table of values used in track-seek estimator 204 for a portion of a simulated ascending track seek operation. At the beginning of the track seek, the actuator is following track number 5234, and is at servo sector (Q(n)) number 43. Referring to the first row of the table in FIG. 9, the local index n is initialized to 0, Q(0) received from the decoder 203 is 43, and XM(0) received from decoder 203 is 2. At servo sector number 43, there is only an abbreviated Gray code, and so there is no full track number output S(0) received from the decoder. However, the starting track number Ss is known during track follow mode to be 5234, and this is provided by controller 201. YM(0) is 0, according to equation [2], and E(−2)=E(−1)=K=k=0, as initial values. This produces an initial estimate for E(0) of 0, according to equation [3], resulting in an estimated acceleration a(n) of 0 (equation [4]) which is within the limit. The value k is then incremented, and E(0) is recomputed according to equation [3] as 16, resulting in an acceleration of 16 tracks/interval$^2$, according to equation [4]. This quantity is well in excess of a typical limit (which may be, e.g., 4). Therefore, the second estimate E(0) is rejected, k is decremented, and E(0) becomes 0. The resulting track estimate ES(0) is 5234, according to equation [5], which is the value shown in the first row of FIG. 9. The velocity EV(0) is 0 (equation [6]).

At the next servo sector, some movement of the actuator has been detected. In the example, the actual movement is about 1.5 tracks, which the decoder reads as XM(1)=4, and therefore YM(1)=2. Again, no value S(1) is available. E(1) is initially estimated as 2, giving an acceleration a(1) of 2 (within the limit). The value k is then incremented, E(1) recomputed as 18, giving a value a(1) of 18, which is rejected, so E(1) becomes 2, and the resultant track estimate ES(1) becomes 5236, according to equation [5]. The velocity estimate EV(1) is 2, according to equation [6].

These computations are repeated with each successive servo sector. Referring to the 6$^{th}$ row of FIG. 9, servo sector Q(5) is 48, and at this servo sector a full track number S(5) is available, it being 5257. The track estimate ES(n) is produced as before, and it is identical to S(n), so no error is indicated (ERR(5)=0).

If we skip on down to the last row of FIG. 9, it will be noted that at this point, the actual velocity XV(19) is 28.5 tracks/interval, which is well in excess of M. However, the process explained above accurately produces a position and velocity estimate. XM(19) is 15, and normalizing this produces YM(19)=13. It will be noted that E(17)=230 (i.e., E(17)=ES(17)−Ss) and E(18)=257. To produce an estimate E(18) of 257, K+k=16, an therefore K is now set to 16. Using equation [3], E(19) is initially calculated to be 269, and a(19) is −15, according to equation [4]. This value for a(19) being less than the limit, the value k is incremented, and E(19) is recomputed as 285, giving an acceleration a(19) of 1. This value being less than the acceleration limit, k is again incremented, E(19) is recomputed as 301, giving an acceleration a(19) of 17. This acceleration is well in excess of the limit, and therefore k is decremented and the immediately preceding value of 285 is accepted as the correct value of E(19). This value of E(19) produces a track estimate ES(19) of 5519, according to equation [5], and a velocity estimate EV(19) of 29, according to equation [6].

It will be understood that disk drive operations unrelated to track number determination have not been described in detail above or shown in the figures. In fact, a disk drive typically performs multiple concurrently executing tasks, of which track number determination for actuator control is only one. A typical disk drive responds to many different types of commands; responsive behavior may be very complex; exchange of information with the host may require many steps; etc. These details have been omitted from the description herein for clarity of illustration.

Additional Considerations

In general, the routines executed to implement the illustrated embodiments of the invention, whether implemented as part of an operating system or a specific application, program, object, module or sequence of instructions are referred to herein as "programs" or "control programs". The programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning digital devices such as disk drives, the various embodiments of the invention are capable of being distributed as a program product in a variety of forms, and the invention applies equally regardless of the particular type of signal-bearing media used to actually carry out the distribution. Examples of signal-bearing media include, but are not limited to, recordable type media such as volatile and non-volatile memory devices, floppy disks, hard-disk drives, CD-ROM's, DVD's, magnetic tape, and transmission-type media such as digital and analog communications links, including wireless communications links. Examples of signal-bearing media are illustrated in FIG. 1 as disk surface 102, in FIG. 2 as ROM 222.

It will be understood that many algebraically equivalent variations are possible in the seek estimation algorithm described above, which would produce the same results. For example, it is not necessary to first normalize XM(n), and the downstream calculations could be modified to use non-normalized values. Similarly, instead of E(n), an absolute value of travel, the actual travel (positive or negative) could be used, or the actual track number could be used. Additionally, k could be iterated either as an ascending value which stops when the limit is exceeded, or as a descending value which stops when the limit is not exceeded.

In the preferred embodiment described above, two Gray codes are used as track identifiers, one Gray code having sufficient bits to express a full track identifier, and the second being an abbreviated form having only enough bits to express a track identifier within some limited range, less than the full range of track identifier. However, it will be understood that other variations are possible consistent with the present invention. As one alternative embodiment, it would be possible to employ only a single abbreviated track identifier in all servo sectors, and to use some auxiliary mechanism for initializing the track number. In this case, it is likely that M would be larger than 16, since the time to recover from a lost condition will probably be longer. For example, it would be possible to simply initialize the disk drive during power-up by going to a fixed location such as the innermost track (which could have a special pattern recorded thereon), and simply estimate track location thereafter using the algorithm described above, without periodic verification of position from a full track identifier in a servo sector. In the event of a lost condition, the actuator would return to the innermost track.

As a further alternative, the longer Gray code need not necessarily have sufficient bits to express a full track identifier, provided there is some other means for determining the range of track identifier. For example, in a zoned data disk having discrete concentric zones of differing data frequencies, it may be possible to determine the correct zone from the frequency, and to express a track identifier in the longer Gray code only within the range of a particular zone. In another alternative embodiment, there could be three or more gray codes of differing length, so that a full Gray code is used on an even less frequent basis.

In the preferred embodiment, both the full track identification field 410 and the abbreviated track identification field 411 are Gray code encodings of a track number (or portion of the track number). Gray codes are often used in disk drive design to facilitate reading during seek operations. However, a Gray code encoding is not strictly necessary, and in an alternative embodiment, a track number or a track number modulo M may be recorded in a form other than a Gray code. These numbers could be recorded as unencoded binary track numbers, or could be recorded using any alternative encoding scheme, now known or hereafter developed.

In the preferred embodiment, the servo track formatting as described herein is employed in a rotating magnetic rigid disk drive device, in which disks are permanently installed in the drive. However, such a formatting could alternatively be used in a removable disk having a rigid or non-rigid substrate and data recorded in tracks on its surface.

In the preferred embodiment, the data recording tracks are concentric. However, as is known in the art, the tracks could also be spiral tracks.

Although a specific embodiment of the invention has been disclosed along with certain alternatives, it will be recognized by those skilled in the art that additional variations in form and detail may be made within the scope of the following claims:

What is claimed is:

1. A rotating magnetic disk drive data storage device, comprising:

a disk drive base;

a rotatably mounted disk and spindle assembly, said disk and spindle assembly comprising at least one rigid disk for recording magnetically encoded data on at least one surface of said at least one rigid disk;

a movable actuator supporting at least one transducer head, said actuator positioning said at least one transducer head to access said magnetically encoded data on said at least one surface of said at least one rotatably mounted disk;

a plurality of angularly spaced track identifying fields recorded on said at least one surface of said at least one rigid disk, each said track identifying field uniquely identifying a track of a respective range of tracks, wherein for at least some of said track identifying fields, the range of tracks identified is less than all tracks on said disk surface; and a servo system which determines track identity during a seek operation using said plurality of angularly spaced track identifying fields, said servo system iteratively assuming a track identity based on data from a track identifying field and estimating acceleration of said transducer based on the assumed track identity, until a track identity is found for which estimated acceleration meets a pre-determined threshold.

2. The rotating magnetic disk drive data storage device of claim 1, wherein at least some of said track identifying fields identify a track number modulo M, M being less than the number of tracks recorded on said disk surface, and wherein said servo system iteratively assumes a track identity by assuming an integer value of K and a corresponding track number as K*M+T, where T is a track number modulo M derived from a track identifying field, and by iteratively changing K by an integer whose absolute value is 1.

3. The rotating magnetic disk drive data storage device of claim 1, wherein said servo system estimates acceleration for an assumed track identity as T(n)−2*T(n−1)+T(n−2), where T(n) is an assumed track identity for a track identifying sample n, and where T(n−1) and T(n−2) are previously determined track identities for track identifying samples (n−1) and (n−2), respectively.

4. The rotating magnetic disk drive data storage device of claim 1, wherein embedded servo sectors are recorded at angularly spaced intervals on said disk surface, each servo sector having a respective track identification field.

5. The rotating magnetic disk drive data storage device of claim 4, wherein a servo sector of a first type contains a track identifying field of a first type, said track identifying field of a first type uniquely identifying a track of a first range of tracks, and a servo sector of a second type contains a track identifying field of a second type, said track identifying field of a second type uniquely identifying a track of a second range of tracks, said second range of tracks being less than said first range of tracks.

6. The rotating magnetic disk drive data storage device of claim 5, wherein said servo system periodically compares a track identity derived from a track identifying field of said first type with a track identity determined by assuming a track identity based on data from a track identifying field and estimating acceleration of said transducer based on the assumed track identity, until a track identity is found for which estimated acceleration meets a pre-determined threshold, and generates at least one indication of error if the compared track identities are not the same.

7. The rotating magnetic disk drive data storage device of claim 1, wherein each said track identifying field contains a respective Gray code encoding.

8. A servo system for a rotating magnetic disk drive data storage device, said disk drive data storage device having at least one rotating disk and a movable actuator supporting at least one transducer head, said actuator positioning said at least one transducer head to access said magnetically encoded data on a surface of said at least one rotating disk, wherein a plurality of angularly spaced track identifying fields is recorded on said disk surface, each said track identifying field uniquely identifying a track of a respective range of tracks, wherein for at least some of said track identifying fields, the range of tracks identified is less than all tracks on said disk surface, said servo system comprising:

a decoder which decodes information in said track identifying fields;

a track seek estimator which determines track identity during a seek operation using said plurality of angularly spaced track identifying fields, said servo system iteratively assuming a track identity based on data from a track identifying field and estimating acceleration of said transducer based on the assumed track identity, until a track identity is found for which estimated acceleration meets a pre-determined threshold; and an actuator controller which controls the movement of said actuator using the track identity determined by said track seek estimator.

9. The servo system for a rotating magnetic disk drive data storage device of claim 8, wherein at least some of said track identifying fields identify a track number modulo M, M being less than the number of tracks recorded on said disk surface, and wherein said track seek estimator iteratively assumes a track identity by assuming an integer value of K and a corresponding track number as K*M+T, where T is a track number modulo M derived from a track identifying field, and by iteratively changing K by an integer whose absolute value is 1.

10. The servo system for a rotating magnetic disk drive data storage device of claim 8, wherein said track seek estimator estimates acceleration for an assumed track identity as T(n)−2*T(n−1)+T(n−2), where T(n) is an assumed track identity for a track identifying sample n, and where T(n−1) and T(n−2) are previously determined track identities for track identifying samples (n−1) and (n−2), respectively.

11. The servo system for a rotating magnetic disk drive data storage device of claim 8, wherein embedded servo sectors are recorded at angularly spaced intervals on said disk surface, each servo sector having a respective track identification field.

12. The servo system for a rotating magnetic disk drive data storage device of claim 11, wherein a servo sector of a first type contains a track identifying field of a first type, said track identifying field of a first type uniquely identifying a track of a first range of tracks, and a servo sector of a second type contains a track identifying field of a second type, said track identifying field of a second type uniquely identifying a track of a second range of tracks, said second range of tracks being less than said first range of tracks.

13. The servo system for a rotating magnetic disk drive data storage device of claim 12, wherein said servo system periodically compares a track identity derived from a track identifying field of said first type with a track identity determined by assuming a track identity based on data from a track identifying field and estimating acceleration of said transducer based on the assumed track identity, until a track identity is found for which estimated acceleration meets a pre-determined threshold, and generates at least one indication of error if the compared track identities are not the same.

14. The servo system for a rotating magnetic disk drive data storage device of claim 8, wherein each said track identifying field contains a respective Gray code encoding.

15. A method for determining track identity in a rotating magnetic disk drive data storage device having a plurality of embedded angularly spaced track identifying fields recorded a data disk surface, each said track identifying field uniquely identifying a track of a respective range of tracks, wherein for at least some of said track identifying fields, the range of tracks identified is less than all tracks on said disk surface, said method comprising the steps of:

(a) assuming a track identity based on data from a track identifying field;

(b) estimating an acceleration of a transducer head based on said assumed track identity;

(c) comparing the acceleration estimated by said estimating step (b) with a pre-determined acceleration limit;

(d) rejecting the assumed track identity if said acceleration estimated by step (b) exceeds said pre-determined acceleration limit; and (e) repeating steps (a) through (d) until an optimum track identity is found.

16. The method of claim 15, wherein at least some of said track identifying fields identify a track number modulo M, M being less than the number of tracks recorded on said disk surface, and wherein said step (a) assumes a track identity by assuming an integer value of K and a corresponding track number as K*M+T, where T is a track number modulo M derived from a track identifying field, and by iteratively changing K by an integer whose absolute value is 1.

17. The method of claim 15, wherein said step (b) estimates acceleration for an assumed track identity as T(n)−2*T(n−1)+T(n−2), where T(n) is an assumed track identity for a track identifying sample n, and where T(n−1) and T(n−2) are previously determined track identities for track identifying samples (n−1) and (n−2), respectively.

18. A track seek estimator for a rotating magnetic disk drive data storage device, said track seek estimator embodied as a plurality of processor executable instructions recorded on signal bearing media, said disk drive data storage device having a plurality of embedded angularly spaced track identifying fields recorded a data disk surface, each said track identifying field uniquely identifying a track of a respective range of tracks, wherein for at least some of said track identifying fields, the range of tracks identified is less than all tracks on said disk surface, wherein said track seek estimator, when executed by a processor of said disk drive, performs the steps of:

(a) assuming a track identity based on data from a track identifying field;

(b) estimating an acceleration of a transducer head based on said assumed track identity;

(c) comparing the acceleration estimated by said estimating step (b) with a pre-determined acceleration limit;

(d) rejecting the assumed track identity if said acceleration estimated by step (b) exceeds said pre-determined acceleration limit; and (e) repeating steps (a) through (d) until an optimum track identity is found.

19. The track seek estimator of claim 18, wherein at least some of said track identifying fields identify a track number modulo M, M being less than the number of tracks recorded on said disk surface, and wherein said step (a) assumes a track identity by assuming an integer value of K and a corresponding track number as K*M+T, where T is a track number modulo M derived from a track identifying field, and by iteratively changing K by an integer whose absolute value is 1.

20. The track seek estimator of claim 18, wherein said step (b) estimates acceleration for an assumed track identity as $T(n)-2*T(n-1)+T(n-2)$, where $T(n)$ is an assumed track identity for a track identifying sample n, and where $T(n-1)$ and $T(n-2)$ are previously determined track identities for track identifying samples (n-1) and (n-2), respectively.

* * * * *